Dec. 2, 1930.    J. O. LEWIS    1,783,441
VALVE
Filed July 8, 1929
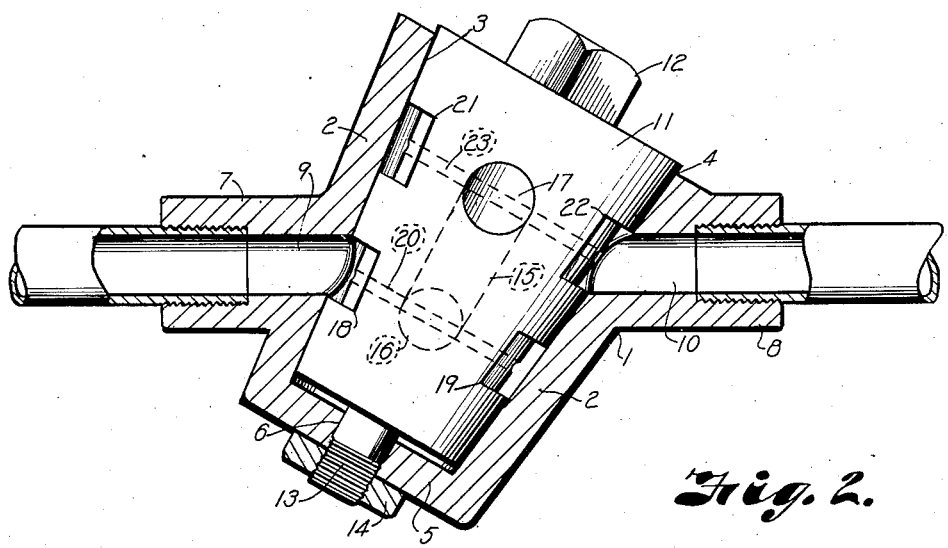
INVENTOR
BY James O. Lewis.
   Arthur C. Brown.
ATTORNEY Patented Dec. 2, 1930

1,783,441

UNITED STATES PATENT OFFICE

JAMES O. LEWIS, OF TULSA, OKLAHOMA

VALVE

Application filed July 8, 1929. Serial No. 376,664.

My invention relates to valves or stop cocks and has for its principal object to prevent seizing or binding of the plug of the cock without affecting its sealing function, by equalizing fluid pressure on opposite sides of the plug member.

In accomplishing this and other objects of the invention, I have provided improved details of structure, the preferred forms of which are illustrated in the accompanying drawings, wherein:

Fig. 1 is a central, vertical section through the valve housing showing the valve plug in closed position.

Fig. 2 is a central vertical section through the valve, showing the valve open.

Fig. 3 is a section through the valve plug on the line 3—3, Fig. 2.

Fig. 4 is a central longitudinal section through a modified form of the valve.

Referring in detail to the drawings:

1 designates a valve housing including a body 2 enclosing a frustro concave plug chamber 3, having an open upper end 4 and a bottom wall 5 provided with a central opening 6. Located on opposite sides of the housing are lateral extensions 7 and 8 angularly disposed with relation to the axis of the housing, and having aligning openings 9 and 10 threaded at their outer ends for connection with a flow line, and both communicating with the chamber 3.

Seated in the chamber 3 is a tapered valve plug 11 having the usual squared wrench shank 12 whereby the plug may be rotated for opening and closing the valve and a threaded shank 13 rotatable in the opening 6 and provided with a nut 14 for anchoring the plug in the housing. Extending diagonally through the plug is a channel 15, the ends 16 and 17 of which are adapted for registering with the openings 9 and 10 respectively, to provide a channel for the flow of fluid through the valve when the plug is set in open position.

Provided in the walls of the plug 11, in diametrical alignment at right angles to and below the channel 15 are recesses 18 and 19 connected by a passageway 20, and provided in the walls of the plug in diametrical alignment at right angles to and above the channel 15 are recesses 21 and 22 connected by a passageway 23, the recesses 18 and 22 being adapted for registering with the openings 9 and 10 respectively when the valve is closed, to permit passage of fluid from the up side of the flow line to the opposite side thereof to equalize pressure of the fluid on opposite sides of the plug.

With the valve constructed and assembled as described and mounted in a flow line, its operation is as follows:

The valve plug 11 may be positioned as shown in Fig. 1 with the channel 15 at right angles to the line of flow for closing the valve, and the recesses 18 and 22 registering with the openings 9 and 10.

Assuming that fluid under pressure is admitted to the valve through the opening 9 and exerted on the valve plug 11 in the direction indicated in Fig. 1, then the fluid passes through the passageway 20 into the recess 19, causing an equal pressure to be exerted on the opposite side of the plug.

Should the valve be set for flow of fluid through the opening 10 while the valve is closed, the fluid would be delivered through the port 23 to the recess 21 causing equalization of pressure on opposite sides of the plug for such setting of the valve.

When the plug 11 is rotated 90° from the position shown in Fig. 1, the channel 15 aligns with the opening 9 and 10 providing a through channel for the flow of fluid through the valve.

In the modified form of the valve shown in Fig. 4, the housing 24 is provided with openings 25 and 26 at right angles to the plug seat chamber 27 and the pressure equalizing recesses 28 are located in the wall of the chamber instead of in the wall of the plug, the valve plug 29 being provided with an ogee passageway 30 for communication with the openings 25 and 26, and having ports 31 and 32 for communication with the recesses 28 when the valve is closed.

What I claim and desire to secure by Letters Patent is:

1. A valve of the character described including a housing having opposite flow inlet and outlet, a plug rotatable in said housing having a channel extending diagonally through the plug and adapted for providing direct communication between the inlet and outlet of the housing, one of said members having a recess and adapted for communication with said inlet when the valve is closed and having a diametrically opposite recess, the plug member having a passageway connecting said recesses.

2. A valve of the character described including a housing having opposite flow, inlet and outlet, a plug rotatable in said housing having a channel adapted for communication with the inlet and outlet when the valve is open and having separate passageways leading through said plug above and below said channel and adapted for communication respectively with said housing inlet and outlet, said plug having a recess at the ends of each passageway.

3. A valve of the character described including a housing having a flow channel and an angularly disposed bore intersecting the channel, a plug rotatable in said bore and having a through opening registerable with said channel, said plug having upper and lower diametrically opposed recesses respectively registerable with opposite ends of said channel and ports connecting said recesses.

4. A valve of the character described including a housing having a flow channel and an angularly disposed bore intersecting the channel, a plug rotatable in said bore and having a through opening selectively registerable with said channel, said plug having through ports and diametrically opposed recesses connected by said ports and in radial spaced relation with the ends of said opening and registerable with said channel.

5. A valve of the character described including a housing having a flow channel and an angularly disposed tapered bore intersecting the channel, a tapered plug rotatable in said bore and having a through opening selectively registerable with said channel, said plug having a through port above and below said channel and a recess at each end of the ports, and means for adjusting the plug in the housing.

In testimony whereof I affix my signature.

JAMES O. LEWIS.